United States Patent
Lawson et al.

(10) Patent No.: US 7,042,989 B2
(45) Date of Patent: May 9, 2006

(54) FLEXIBLE CALL ALERTING

(75) Inventors: Debra K. Lawson, Indianapolis, IN (US); Gail D. Mosley, Indianapolis, IN (US); Stephen M. Mueller, Austin, TX (US); Jeffrey Lee Scruggs, Round Rock, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 10/320,397

(22) Filed: Dec. 17, 2002

(65) Prior Publication Data

US 2004/0114733 A1   Jun. 17, 2004

(51) Int. Cl.
*H04M 1/64* (2006.01)

(52) U.S. Cl. .................... 379/88.17; 709/218

(58) Field of Classification Search ............ 379/37, 379/38, 40, 88.13, 88.17, 210.01, 200.01, 379/209.01; 709/26, 218
See application file for complete search history.

(56) References Cited

U.S. PATENT DOCUMENTS

| | | | |
|---|---|---|---|
| 4,839,749 A | 6/1989 | Franklin | |
| 4,969,136 A | 11/1990 | Chamberlin et al. | |
| 5,416,473 A | 5/1995 | Dulaney, III et al. | |
| 5,521,589 A | 5/1996 | Mondrosch et al. | |
| 5,602,963 A | 2/1997 | Bissonnette et al. | |
| 5,903,845 A | 5/1999 | Buhrmann et al. | |
| 5,933,778 A | 8/1999 | Buhrmann et al. | |
| 5,958,016 A | 9/1999 | Chang et al. | |
| 6,038,542 A | 3/2000 | Ruckdashel | |
| 6,052,563 A | 4/2000 | Macko | |
| 6,253,062 B1 | 6/2001 | Leyendecker | |
| 6,463,130 B1 * | 10/2002 | Malik ..................... | 379/88.22 |
| 6,766,000 B1 * | 7/2004 | Squibbs et al. ......... | 379/88.23 |
| 2003/0091016 A1 * | 5/2003 | Ko et al. | |

* cited by examiner

*Primary Examiner*—Fan Tsang
*Assistant Examiner*—Ming Chow
(74) *Attorney, Agent, or Firm*—Greenblum & Bernstein, P.L.C.

(57) ABSTRACT

A subscriber implements and access telecommunications services, using a graphical user interface (GUI) via the Internet, and an interactive voice response (IVR) system via the public switched telecommunications network (PSTN). The subscriber can schedule, create, and edit call alert messages to be sent by a flexible call alert service to multiple recipients at a subscriber described time.

13 Claims, 14 Drawing Sheets

FLEXIBLE CALL ALERTING

CROSS-REFERENCE TO RELATED APPLICATION

This application is related to U.S. patent application Ser. No. 10/134,637, filed Apr. 30, 2002, entitled "Voice Enhanced Services" in the names of Susanne M. CROCKETT et al. which is further related to U.S. patent application Ser. No. 09/716,276 filed on Nov. 21, 2000, and U.S. patent application Ser. No. 09/983,303 filed on Nov. 24, 2001, the disclosures of which are expressly incorporated by reference herein in their entireties. The present application is also related to U.S. patent application Ser. No. 09/619,312, filed Jul. 19, 2000, entitled "Method for Using Data Networks to Update Call Control Information in the Public Switched Telephone Network" in the names of Anil BHANDARI, et al., the disclosure of which is expressly incorporated by reference herein in its entirety.

BACKGROUND OF THE INVENTION

1. Field of the Invention

The present invention relates to the field of telecommunications. More particularly, the present invention relates to programming and sending a call alert based on a schedule and message generated by a subscriber.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Authentication/Subscription Information (ASI)
Central Office (CO)
Common Object Request Broker Architecture (CORBA)
Domain Name Server (DNS)
Dual Tone Multi-Frequency (DTMF)
Electronic Key Telephone System (EKTS)
Enhanced Media Resource Server (eMRS)
Electronic Numbering (ENUM)
Extensible Markup Language (XML)
File Transfer Protocol (FTP)
Generic Data Interface (GDI)
Graphical User Interface (GUI)
HyperText Mark-Up Language (HTML)
HyperText Transfer Language Protocol (HTTP)
Incoming Call Manager (ICM)
Intelligent Peripheral (IP)
Interactive Voice Response (IVR)
Internet Call Waiting (ICW)
Lightweight Directory Access Protocol (LDAP)
Outgoing Call Control (OCC)
Personal Computer (PC)
Personal Call Manager/Personal Communications Manager (PCM)
Personal Identification Number (PIN)
Plain Old Telephone Service (POTS)
Public Switched Telephone Network (PSTN)
Service Control Point (SCP)
Service Management System (SMS)
Service Node/Intelligent Peripheral (SN/IP)
Service Switching Point (SSP)
Session Initialization Protocol URL (SIP URL)
Signaling System 7 (SS7)
Signaling Transfer Point (STP)
Telephonic URL (TEL URL)
Transmission Control Protocol/Internet Protocol (TCP/IP)
Uniform Resource Identifier (URI)
Uniform Resource Locator (URL)
Uniform Resource Name (URN)
Voice Over Internet Protocol (VoIP)
World Wide Web (WWW)
World Wide Web Consortium (W3C)

3. Background Information

Currently, subscribers to call control services within the public switched telephone network (PSTN) are able to initiate and modify their services by calling a customer service representative or by interacting with an interactive voice response (IVR) system using a standard dual tone multi-frequency (DTMF) telephone device. These methods practically limit the number and types of services that can be provided to and modified by the subscribers because all information pertaining to the services is presented audibly. In addition, the potential market for subscribers to call control services is not fully exploited because of customer reluctance to use IVR systems.

There have been attempts to remedy the problems associated with IVR access to PSTN services. These attempts incorporate use of packet switched data networks, such as the Internet, to avoid conventional IVR systems and to streamline the initiation and modification functions. The current Internet based systems have several drawbacks, however, including the inability to ensure near real-time update of services and incompatibility with existing IVR implementations.

For many call control services, subscribers must submit requests, to the customer service arm of their provider to initiate new services or update existing ones. The requests are implemented according to the provider's time line and discretion. It is difficult for the users to gauge when the service alteration will take effect. Also, because the current Internet based systems operate exclusively from the conventional IVR systems, i.e., the two systems cannot coexist, customers must select either the Internet interface or the IVR interface. Consequently, a customer who has selected the Internet interface, and who is without a personal computer (PC) and/or Internet access, is not able to make desired changes to his or her services through an IVR. The inability to implement desired changes is especially troublesome considering that users are often interested in altering some call services (e.g., call screening, call forwarding, paging, and caller ID) when they are away from their home or business telephone and PC.

An example of call control services provided over a packet switched data network is described in CHANG et al., U.S. Pat. No. 5,958,016, which teaches enabling advanced intelligence network (AIN) services over the World Wide Web (WWW or "the web") through a provisioning system called the service management system (SMS). The service management system as disclosed in CHANG et al., however, does not ensure near real-time data update and is not compatible with existing IVR implementations. Therefore, the services presented via the Web are limited in functionality to the extent near real-time data updates are not guaranteed. For example, if a subscriber modifies an incoming call service, which blocks calls from selected phone numbers or classes of phone numbers, to add an allowed incoming phone number, the subscriber will not begin immediately to receive calls from the previously blocked phone number. Rather, the subscriber must wait an unspecified period of time for the service to be updated via the SMS. Also, as discussed above, the web interface and the IVR interface are mutually exclusive.

In addition to the above, it is desirable to have a service by which a subscriber can schedule an event and use the telephone system to alert call alert recipients at times and with a message determined by the subscriber. Such a service could remind a subscriber or other party about birthdays, anniversaries, meetings, laundry pick ups, oil changes, doctor appointments, deadlines, or other scheduled events. Using a telephone, subscribers could call into a flexible call alert service and access their personal calendars using an access scheme such as a Personal Identification Number (PIN).

Current call alert systems allow a subscriber to schedule call backs to a subscriber's phone number, however, these systems do not allow a subscriber to dial a group with multiple numbers, including numbers of those who are not subscribers. Moreover, today's systems do not include systems by which subscribers can edit their schedules using the Internet or other web based system.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
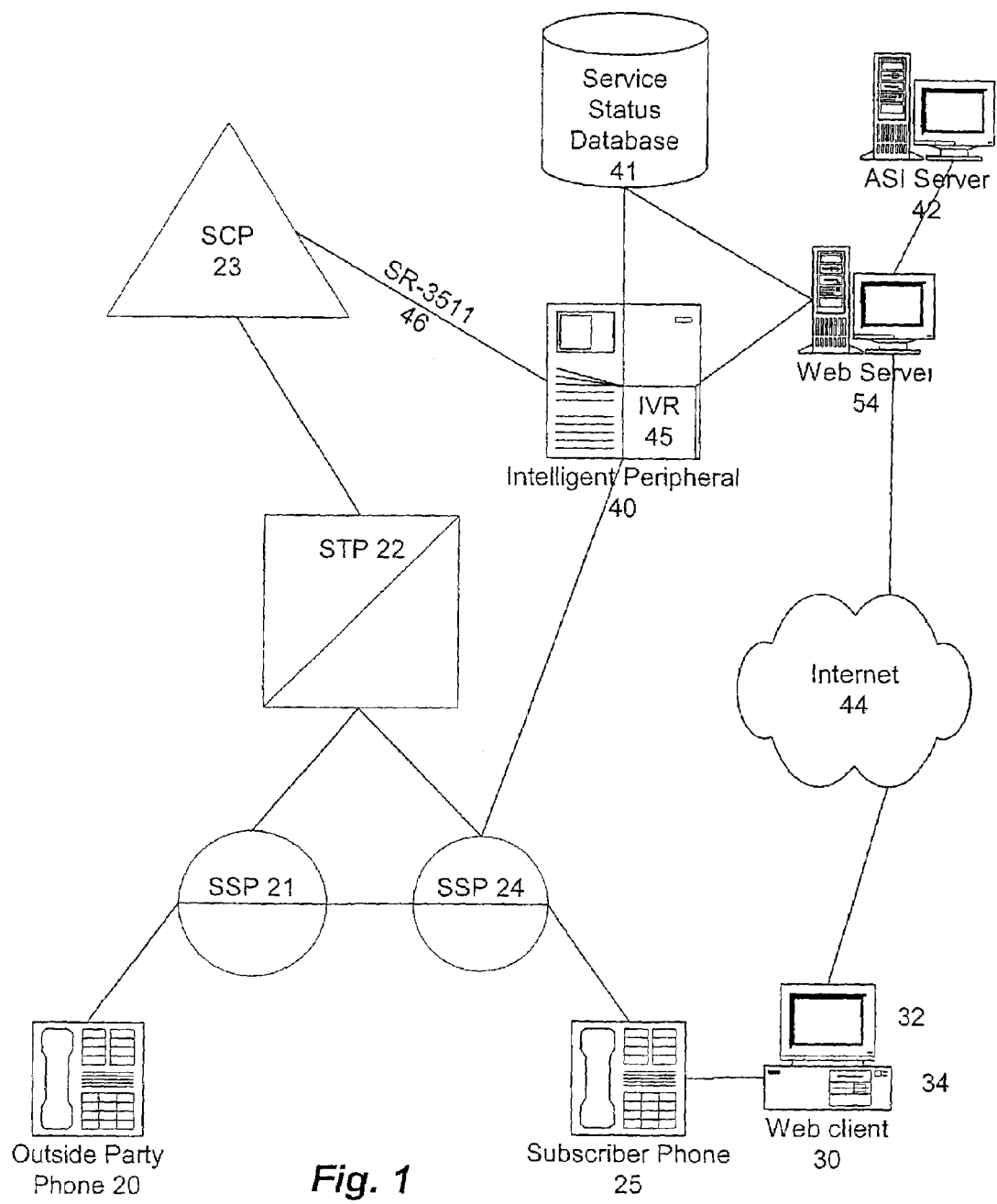
FIG. 1 is a block diagram showing an exemplary PCM telecommunications network, according to an aspect of the present invention.

The present invention relates to enhancing AIN call services to further resolve the previously identified problems, simply and efficiently. The AIN call services to which the voice enhancement applies may be implemented individually or through a Personal Call Manager (PCM) system, along with other telecommunication services, such as flexible call alert services. An embodiment of the present invention is an AIN based service that allows a subscriber connected to a communications network, including the Internet and other packet switched type data networks, as well as through conventional IVR and intelligent peripheral systems, to customize and execute the AIN call services, with near real-time access to the service data. Furthermore, an aspect of the present invention enables the IVR and intelligent peripheral systems to incorporate voice recognition, further simplifying the subscriber and/or caller interaction with the AIN call services when not using the communications network. Using the Internet or the IVR system of the intelligent peripheral, subscribers are additionally enabled by aspects of the present invention to generate schedules and messages to be sent by the intelligent peripheral to a group of multiple recipients at times designated by the subscriber.

In view of the above, the present invention through one or more of its various aspects and/or embodiments is presented to accomplish one or more objectives and advantages, such as those noted below.

According to an aspect of the present invention, a method is provided for implementing a flexible call alert. The method includes receiving, from a subscriber via a web client, a message, information of multiple recipients, and a time when the message is to be delivered to the recipients over a telephone system. The method also includes determining that the time input by the subscriber has been reached, and initiating the delivery of the message to the recipients when the time has been determined to have been reached.

In one embodiment, the initiating includes using multiple addresses for each recipient, and stopping the delivery of the message to the recipient after the recipient has received the message. The method may also include repeating the initiating at a default repeat time, default repeat time interval, subscriber set repeat time, or subscriber set repeat time interval when the subscriber does not receive the message; and terminating the repeating at a subscriber set terminating time, previously set terminating time, or a set number of repeats. The addresses for the recipient may be received from an ENUM enabled directory. Broadcasting to or sequencing of the addresses may occur.

In an embodiment, event information may be logged and stored for use in billing and presentment. The method may also include billing the subscriber for using flexible call alert in response to the message, information, and time received.

According to another aspect of the present invention, a method is provided for implementing a flexible call alert. The method includes receiving subscriber information and a message by an intelligent peripheral; and storing the received information and the message in a recordings database. The method also includes setting an alert time based on the received information, and determining by the intelligent peripheral that the alert time has been reached. The method further includes obtaining the information and the message from the recordings database, and initiating the delivery of the message to recipients based on the alert time.

In one embodiment, multiple addresses are used for each recipient, and the delivery of the message to the recipient is stopped after the recipient has received the message. The subscriber may be billed for using flexible call alert in response to the message and information being received from the subscriber.

In another aspect of the present invention, a computer readable medium is provided with instructions to implement a flexible call alert. The instructions include receiving, from a subscriber via a web client, a message, information of recipients, and a time when the message is to be delivered to the recipients over a telephone system. Other instructions include determining that the time input by the subscriber has been reached, and initiating the delivery of the message to the recipients when the time has been determined to have been reached.

In another aspect, a flexible call alert system includes a recording database and an intelligent peripheral. The intelligent peripheral receives subscriber information and a message from a web client, sends the subscriber information and the message to the recording database, sets a timer based on the subscriber information, retrieves at least part of the subscriber information and the message from the recording database when a time on the timer has expired, and sends the message to recipient communications devices based on the subscriber information. The system may also include a directory that sends multiple addresses for each recipient to the intelligent peripheral.

In one embodiment, the intelligent peripheral sequentially sends a message using the addresses for the recipient and stops sending using the addresses when the recipient receives the message. In another embodiment, the system also includes an SCP that receives from the intelligent peripheral transaction information and stores the transaction information.

According to yet another aspect of the present invention, a method is provided for alerting a subscriber. The method includes prompting the subscriber to enter a time to send a call alert in response to the subscriber having dialed a vertical service code. The method also includes receiving from the subscriber the time to send the call alert, and sending the call alert to the subscriber based upon the received time.

In one embodiment, the method also includes sending another call alert at another time, in response to the caller responding to the sent call alert. In another embodiment, the method also includes preventing the sending of the call alert when the subscriber has dialed another vertical service code and/or billing the subscriber for sending the call alert after the call alert has been sent.

The various aspects and embodiments of the present invention are described in detail below.

Personal Call Manager

The Personal Call Manager (PCM) service is an AIN based service that allows a subscriber connected to a communications network, including the Internet and other packet switched type data networks, as well as through IVR systems, including IVR functionality provided by SN/IPs, to customize and execute services associated with telephonic communications, with near real-time access to the service data. PCM enhances functionality and compatibility with other AIN based call control services, including, for example, the flexible call alert service, discussed below.

FIG. 1 illustrates an exemplary telecommunications network in association with PCM. The network includes an outside party telephone 20, service switching points (SSPs) 21 and 24, and a subscriber telephone 25. The subscriber telephone 25 is any type of PSTN compatible telephone, including a plain old telephone service (POTS) telephone, or a telephone in a Centrex system, a PBX system or electronic key telephone system (EKTS). The exemplary network also includes a signaling transfer point (STP) 22, a service control point (SCP) 23 and an AIN intelligent peripheral (IP) 40, which incorporates an IVR 45.

By way of example, the SCP 23 is implemented with the Telcordia Integrated Service Control Point Current Generation Platform (ISCP)(CGP); the ISCP Next Generation Platform (NGP); the Lucent Advantage Service Control Point (LSCP) and Service Package Application (SPA); or the Telcordia Integrated Service Control Point (ISCP), loaded with ISCP software, available from Telcordia, Murray Hill, N.J.

Depending on the call origination point, the SSP 21 and the SSP 24 may be either the originating or the terminating switch. For example, if a call is placed from the outside party telephone 20 to the subscriber telephone 25, the SSP 21 is the originating switch and the SSP 24 is the terminating switch. If a call is placed from the subscriber telephone 25 to the outside party telephone 20, the SSP 24 is the originating switch and SSP 21 is the terminating switch. However, as a practical matter, the originating switch and the terminating switch may be the same, or the call may be routed through any number of intervening switches in the PSTN between the originating and the terminating switches. The SSPs 21 and 24 include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize AIN protocol. However, embodiments of the present invention may include switches, such as ATM switches, that are incorporated into any alternative telecommunications technology.

The call flow logic of the present invention may be upgraded to accommodate future AIN releases and protocols and future trigger types. Specifications of AIN SSPs may be found in Telcordia GR-1299-CORE, Switch-Service Control Point Application Protocol Interface Generic Requirements, and Telcordia Technical Reference GR-1298-CORE, AIN Switching Systems Generic Requirements, the disclosures of which are expressly incorporated by reference herein in their entireties.

In alternative embodiments, the intelligent peripheral 40 may be a SN/IP, such as an IBM Resource Manager, a Lucent Compact Service Node or a Lucent Enhanced Media Resource Server (eMRS). The data network communicates to the PSTN (specifically the SCP 23) through the intelligent peripheral 40 using the SR-3511 protocol 46, or an equivalent protocol. Also, as stated above, the IVR 45 of the intelligent peripheral 40 is accessible through a PSTN central office switch (CO), such as the SSP 21 or the SSP 24. The intelligent peripheral 40 communicates with the switches using the GR-1129 protocol.

An associated data network includes a web client 30, a web server 54, an authentication/subscription information server 42 and a service status database 41, connectable through the Internet 44. Although FIG. 1 depicts a direct connection between the Internet 44 and the web client 30, such as a conventional T1 or cable modem connection, it is intended to include any type of Internet interface, including a telephone modem connection through the subscriber phone 25 and the associated SSP 24. The web client 30 includes a GUI 32, i.e., a PC, operating client software 34, an example of which is an internet call waiting (ICW) Client, available from Southwestern Bell Telephone Company. Alternatively, the client software 34 can be run at the web server 54. The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

Figure 2:
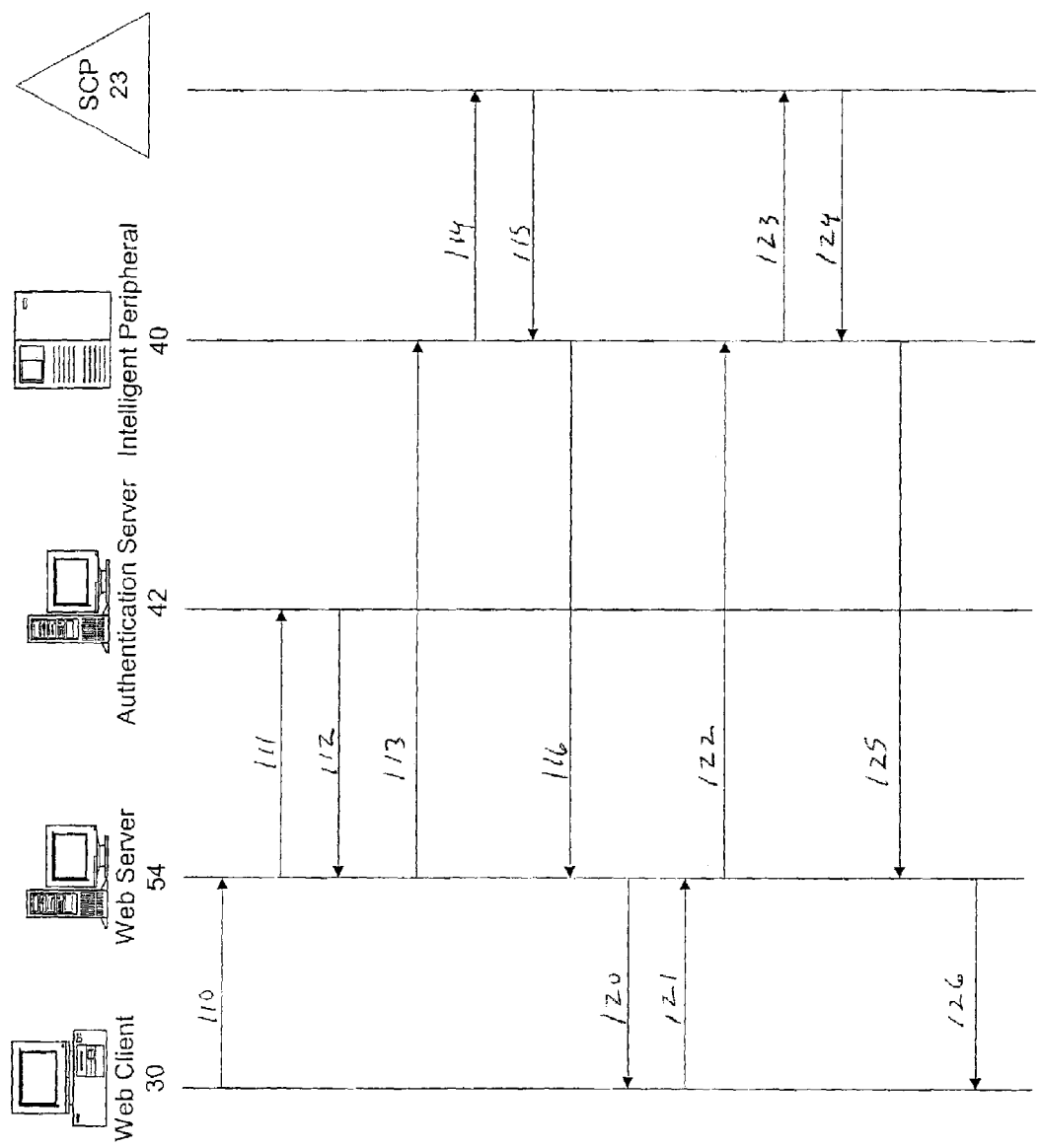
FIG. 2 is a call flow diagram illustrating subscriber requests for information from the PCM system, according to an aspect of the present invention.

FIG. 2 is an exemplary call flow diagram depicting a subscriber using the PCM service. Initially, the subscriber accesses a public packet switched data network, such as the Internet, from a web client 30, using a web browser such as Microsoft Internet Explorer, Netscape Navigator or HotJava. Once on the Internet, the subscriber connects to the web server 54 at step 110, which serves as a secure access platform. The web server 54 receives HyperText Transfer Language Protocol (HTTP) messages from the web client 30 and provides HyperText Markup Language (HTML) or Extensible Markup Language (XML) web pages in response to the subscriber's input to the web client 30. The web pages relate to the subscriber's PCM account.

Once connected to the web server 54, the user must first log-in to the PCM account, also depicted at block 201 in FIG. 4 and described below. The log-in equates to an authentication of the user. To perform the authentication, the web server 54 contacts the authentication/subscription information (ASI) server 42 at step 111, which confirms that the subscriber is an authorized user by verifying at least the subscriber's name and a password. The ASI server 42 also provides to the web server 54 a list of the services to which the user has subscribed in the PCM account at step 112. The services for each phone number are linked to the PCM account through the ASI server 42.

At steps 113 and 114, the web server 54 then retrieves from the SCP 23, via the intelligent peripheral 40, current service data and the related status of the various services, such as flexible call alert, managed through the PCM account. The data and status of the services, i.e., service data, is forwarded to the web client 30 at steps 115 and 116. A PCM summary page is displayed on the web client 30 at step 120, as seen for example in FIG. 7, discussed in detail below.

Figure 3:
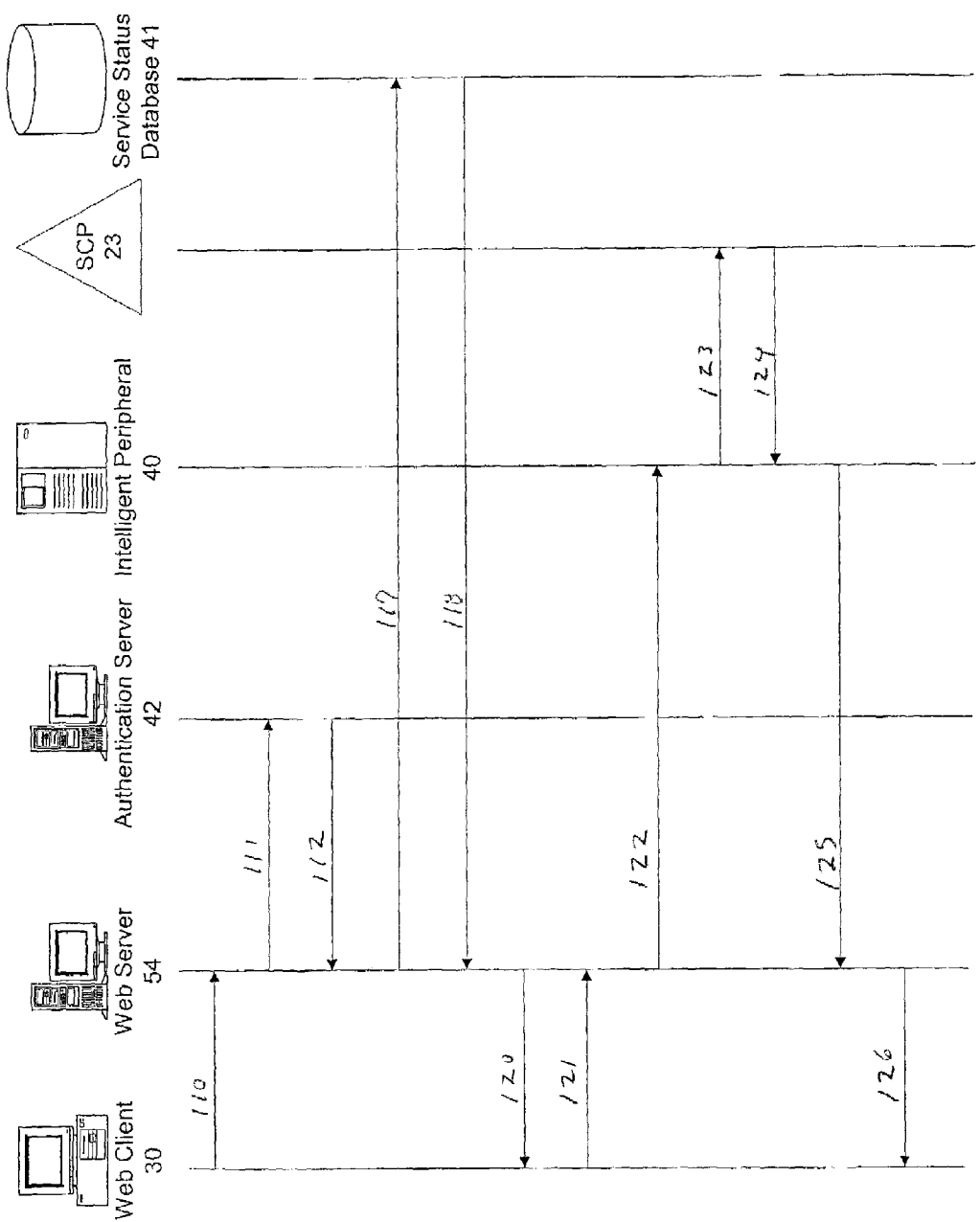
FIG. 3 is a call flow diagram illustrating subscriber requests for information from the PCM system, according to an alternative embodiment of the present invention.

In another embodiment, depicted in FIG. 3, after logging in and being authenticated at steps 110–112, the web server 54 retrieves from a service status database 41 the data and status of the various services managed through the PCM account at steps 117 and 118, rather than from the SCP 23, directly. This database serves as a cache for the service information in the SCP 23. The service status database 41 contains information current to the most recent update interface with the SCP 23. The cache arrangement enables the user to efficiently access this information without waiting for the SCP 23 to process the request. At the same time, it reduces SCP 23 traffic. The service status database 41 is refreshed periodically to ensure currency, as well as pursuant to a specific command by the user. This database is a conventional lightweight directory access protocol (LDAP) database, such as the LDAP database available from Lucent Technologies, Inc. In the alternative, the database may be a standard relational database, such as those available from Oracle Corporation or Sybase, Inc.

Upon review of the service status, the user may choose to interact with one or all of the available services, as shown in FIGS. 2 and 3. When the user selects a desired service, a message is sent at step 121 to the web server 54, which responds with the corresponding service screen. When the user selects a particular service necessitating access to the PSTN, the request is sent to the intelligent peripheral 40 at step 122.

Significantly, the intelligent peripheral 40 may be the same intelligent peripheral that implements IVR access to the user's services through a conventional PSTN. The intelligent peripheral 40 internally translates data messages received from the web server 54 and accesses the relevant call services data from the SCP 23 at step 123 through the SR-3511 protocol, the use of which enables the simultaneous compatibility with functions of the IVR 45. Details of the SR-3511 protocol are provided in Telcordia, Recommendation SR-3511 SCP Intelligent Peripheral (IP) Interface Specification for TCP/IP, Version 5.0 (January 1997), the disclosure of which is expressly incorporated by reference herein in its entirety. In various embodiments, the translation program is coded C, C++ or JAVA. The intelligent peripheral 40 then transmits a summary of the requested service, based on information received from the SCP 23 at step 124, to the web server 54 at step 125. The web server 54 sends the information to the web client 30 at step 126 to be displayed to the user.

At this point, the user may choose to update or to simply review the service information. When the service is updated, the web server 54 sends the update instructions in a data message to the intelligent peripheral 40. The intelligent peripheral then translates the update instruction into the SR-3511 protocol and communicates the updated service parameters directly to the SCP 23.

For example, one available service is call manager, which includes an Incoming Call Manager (ICM), by which the user may prioritize, forward, preview or block selected telephone numbers. In the update procedure, the subscriber enters a telephone number to be blocked, for instance, which the web server 54 communicates to the intelligent peripheral 40. The intelligent peripheral 40, in turn, sends the data via SR-3511 to the SCP 23, which flags the number to be blocked. Because the instructions of the intelligent peripheral 40 to the SCP 23 are sent and implemented immediately, without the involvement of the provider's account management or customer service, the changes to the service are operable and available shortly after the user sends the instructions. In an embodiment that includes the service status database 41, the cache will then be updated in due course to reflect the updated information in the SCP 23.

Figure 4:
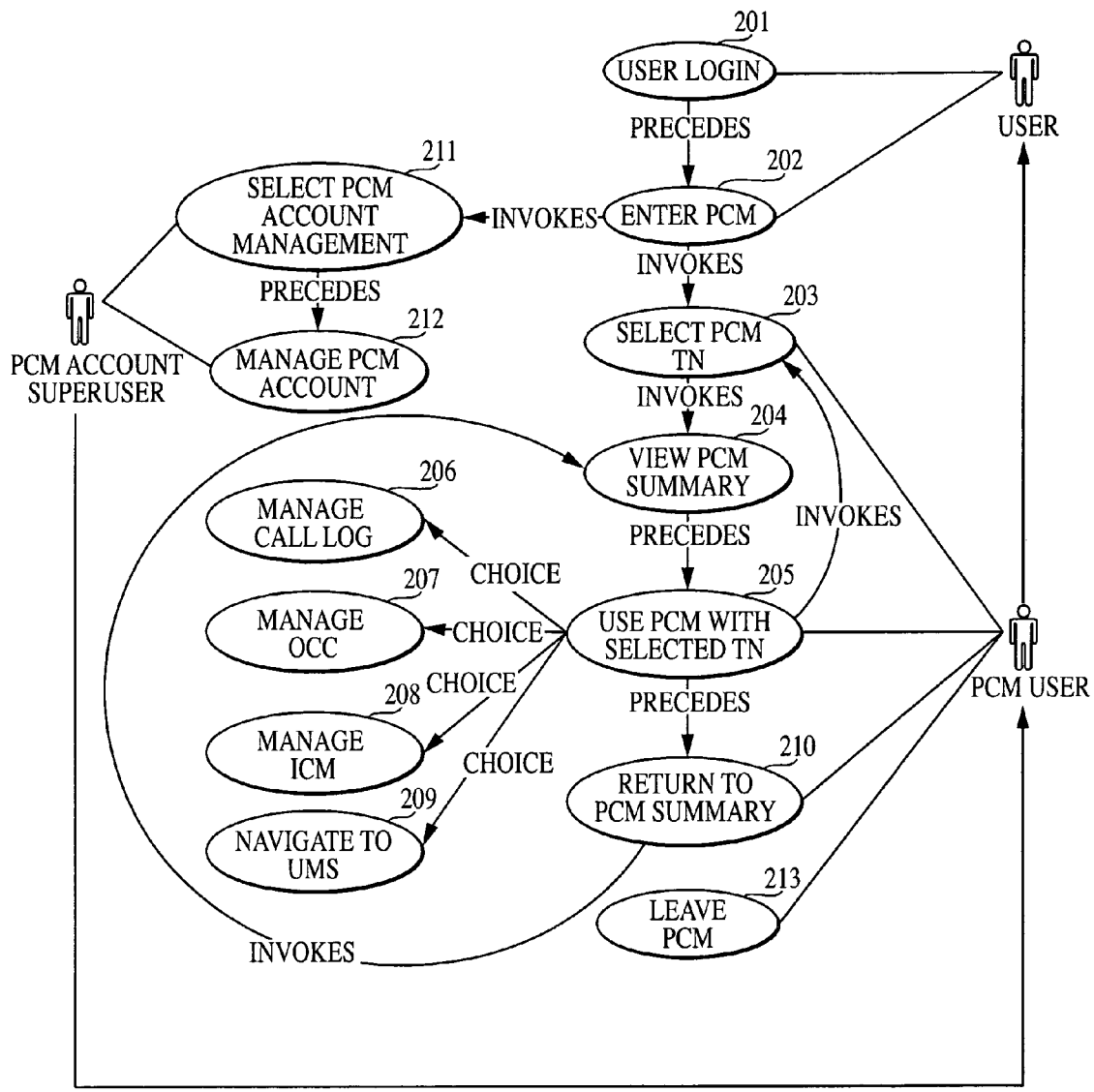
FIG. 4 illustrates user action in an exemplary web-based PCM system, according to an aspect of the present invention.
Figure 5:
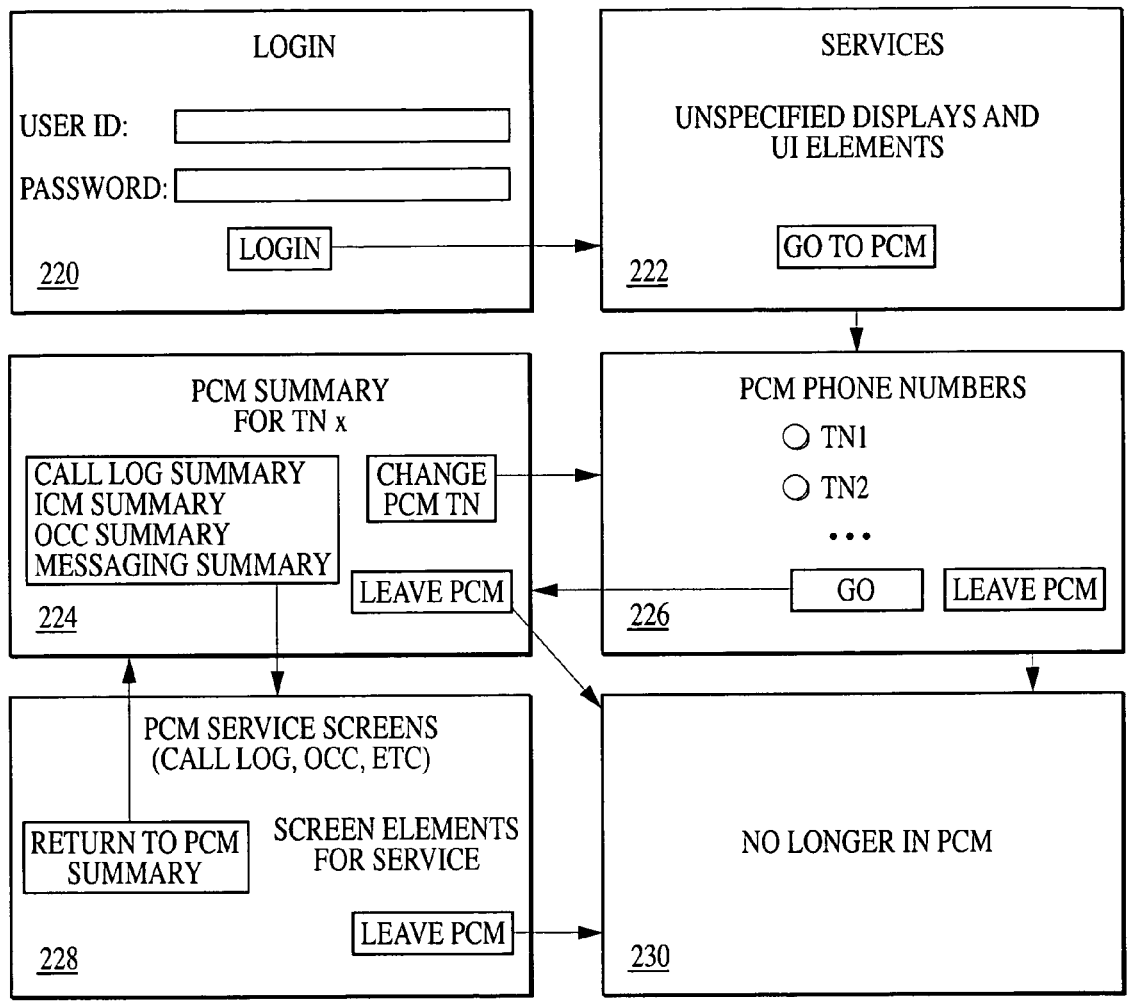
FIG. 5 illustrates an exemplary window navigation flow for basic user actions, according to an aspect of the present invention.

FIG. 4 depicts the procedure followed by the subscriber when first entering the PCM web site. The subscriber must first log-in at block 201. Assuming the subscriber's PCM account has already been established, he or she must provide the authentication data to proceed. The authentication data is entered at a log-in screen, an example of which is depicted in FIG. 5 at screen 220. To maintain the integrity of the secure platform, authentication preferably requires a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the web server 54 responds with a message explaining the problem and allows another chance to enter correct data.

Figure 6:
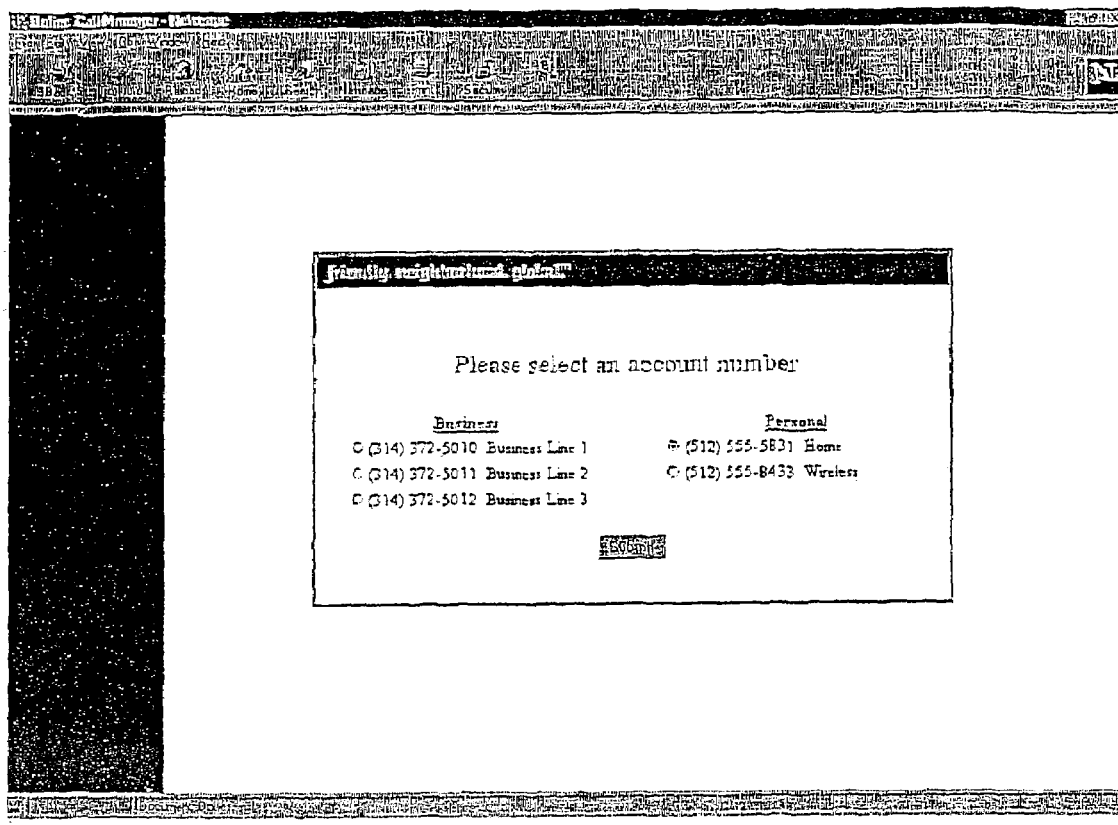
FIG. 6 is an exemplary window to be displayed at the user's PC requesting identification of a PCM account number, according to an aspect of the present invention.

After the user is authenticated, the user proceeds to enter the PCM at block 202. At this time, the user views a general informational screen 222 of FIG. 5, which is formatted at the discretion of the service provider. It may include, by way of example, new services offered to the subscriber. After the user elects to proceed into the PCM, the web server 54 navigates to a page 226 that displays telephone numbers associated with the PCM account(s) to which the user belongs and to which the user is authorized to access. FIG. 6 depicts an exemplary screen displaying phone numbers to which the user has access.

At this point, the user selects a telephone number at block 203 and the corresponding services are displayed for the selected telephone number at screen 224. The user may then elect to implement the various services in place for a particular phone number. In an embodiment of the invention, if the user selects the flexible call alert service in the PCM account, he or she may further be required to enter the appropriate PIN. Alternatively, at block 202 the user may elect to manage the PCM account at blocks 211 and 212, depending on the user's privileges, assigned by the subscriber, within a particular account to manage the PCM account.

If the PCM has more than one associated telephone number, the user would see a web page listing the numbers, as in screen 226 of FIG. 5. The screen has user interface elements that allow the user to select one of the numbers. Thus, each PCM account keeps track of a non-empty set of phone numbers to be managed through the PCM on behalf of the corresponding set of users, presumably members of a family, business, organization or other group related to the subscriber.

After the user selects a phone number at block 203, the system displays for the user a PCM summary page 204 corresponding to the selected telephone number. The PCM summary page displays only data the user is authorized to see for the selected telephone number. As shown at screen 224, the PCM summary provides various options to the user, including by way of example, selecting from among listed services 206–209, returning to select an alternative PCM telephone number or exiting PCM altogether 213.

Figure 7:
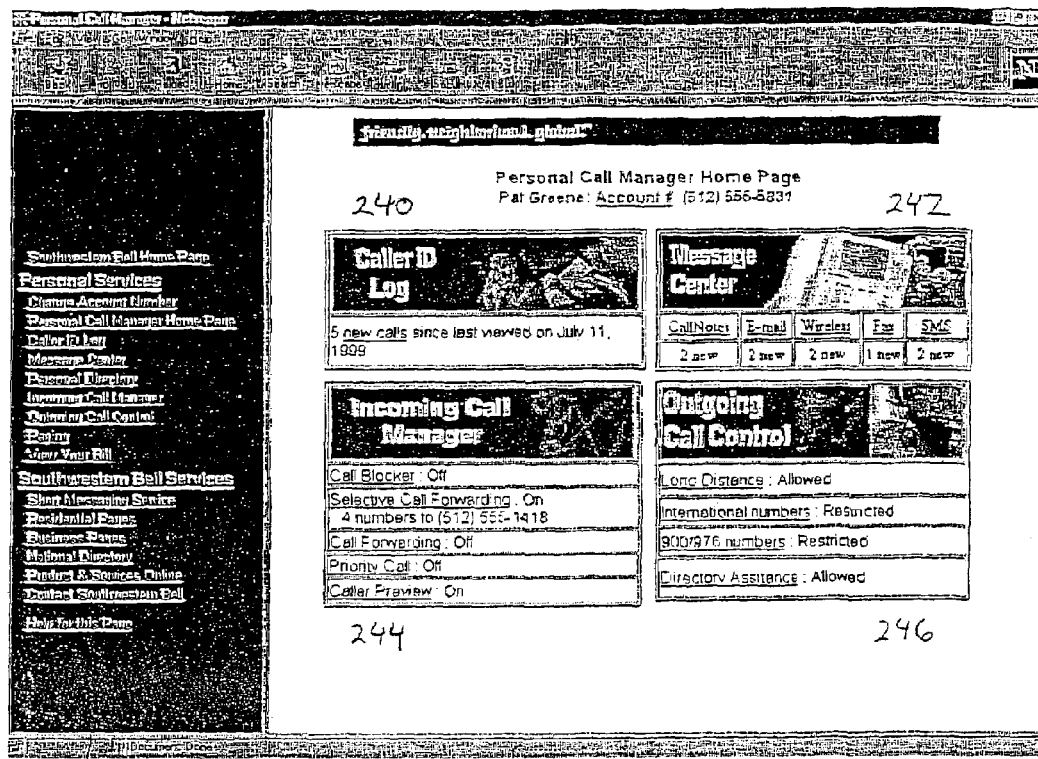
FIG. 7 is an exemplary PCM home page window to be displayed at the user's PC identifying customized user options for a selected account number, according to an aspect of the present invention.

FIG. 7 shows an exemplary PCM summary display, which corresponds to screen 224 of FIG. 5, entitled Personal Call Manager Home Page for account number (512) 555-5831, which is the selected telephone number in the example. FIG. 7 shows four services accessible through the PCM, although the four services are not intended to be limiting. That is, the PCM is able to administer any call services associated with an SCP 23. The services depicted in the PCM summary screen 224, as well as in FIG. 7, are Caller ID Log 240, Message Center 242, Incoming Call Manager (ICM) 244 and Outgoing Call Control (OCC) 246. The displayed information is summary in fashion, the details being available to the user through selection of one of the available services, which displays a PCM service screen 228 of FIG. 5. At the summary screen, the Caller ID Log 240 of FIG. 7 retrieves data from the SCP 23 and shows, for example, the number of call records added since the last review. The Message Center 242 retrieves data from the SCP 23 and shows the number of new call notes, e-mails, wireless calls, faxes and messages reviewed. The ICM 244 of FIG. 7 likewise retrieves data from the SCP 23 and shows the status of the call blocker, call forwarding, priority call and caller preview features. The OCC summary retrieves data from the SCP 23 and shows whether international calls, long distance calls, 900/976 numbers and/or directory assistance calls are restricted.

From the PCM summary screen, the user may choose to use PCM to manage any of the displayed services, indicated at block 205 in FIG. 4. This is done by simply clicking on one of the display boxes 240–246 of FIG. 7 to cause the web server 54 to display a new web page corresponding to the selected service. Or, the PCM summary page includes a list of the personal services 248, which duplicates the display boxes. In addition, the list 248 may include additional personal services that do not require interaction with the SCP 23. These services include, for example, a personal directory, paging capability and billing review.

The paging capability provides the option of paging the subscriber when a caller ID is received from a subscriber specified phone number. Paging may include a page, a wireless short message, an e-mail, or a generated phone call to a specified number. Moreover, caller ID logs can be collected and paged to the subscriber at periodic intervals with summary and/or detailed information.

After selection of one of the services, the web server 54 navigates to and displays the selected services web page, indicated by blocks 206–209, and displays the corresponding service screen 228 of FIG. 5. The user may review information, activate or deactivate the service or change the scope of the service, as desired, in accordance with the level of access available to that user. After accessing one of the available services, the user may return to the PCM summary page at block 210. Returning can be accomplished by selecting a specific option to return or by simply clicking the BACK icon provided by the web browser. The user may also exit PCM at block 213 of FIG. 4, ending the current session at block 230 of FIG. 5.

As stated above, the subscriber may interface with the PCM service, as well as the individual AIN calling services that may be implemented through the PCM service, through the IVR 45 of the intelligent peripheral 40. From any DTMF telephone, the subscriber dials a toll-free number, e.g., an 800 number or local service provider number, to access the IVR 45. Alternatively, the subscriber may dial a star code, such as *95, in response to which the SSP 24 has been programmed to route the connection to the IVR 45 to access a particular AIN service, such as call blocking, discussed below. Once the connection is established, the IVR 45 prompts the subscriber to enter an account number, along with a password or PIN, using the touch tone keypad of the DTMF telephone. Upon successful authentication, the subscriber has the ability to perform any number of administrative and operational functions, such as changing or adding PINs, toggling the services ON and OFF and activating or deactivating customized lists and schedules.

In an embodiment of the invention, the intelligent peripheral 40 (and the IVR 45) are provided with speech recognition functionality. For example, in response to automated voice prompts, an IBM Resource Manager, programmed with speaker independent Nuance 8.0 speech recognition software, available from Nuance Communications, may receive and interpret voice input from the caller, in addition to touch tone signals. Any comparable speech recognition system may likewise be incorporated into the system, such as a Lucent Compact Service Node.

The intelligent peripheral 40 with speech recognition functionality captures analog voice signals of the subscriber and converts the voice signals to digital data, which may be stored in relation to the subscriber's account. The data is segmented, or arranged into recognizable patterns, and compared to previously stored models of words to be recognized.

The segmentation of data may be based on any number of conventional speech recognition techniques. For example, the data may be segmented into phonemes, which are basic sounds or units of speech, and compared to phonetic models to build and identify words. The phoneme based speech recognition may enable identification of continuous or fluent speech from the subscriber. Alternatively, the speech data may be segmented by timing to search for and match previously identified anticipated responses, such as simple words and phrases, including numbers, letters of the alphabet and predetermined command words, such as ON, OFF and the days of the week. The present invention may incorporate any level of speech recognition and associated vocabulary capable of handling basic IVR interactions between the subscriber and the AIN services.

Furthermore, the intelligent peripheral 40 may confirm subscriber responses that result in a low level of confidence in the speech recognition. In other words, the processed subscriber data may be converted into synthesized speech, generated at the intelligent peripheral 40 and transmitted to the subscriber for confirmation. For example, after requesting and receiving the numbers of the subscriber's PIN, the intelligent peripheral 40 generates a prompt asking, "You said that your PIN was '1234.' Please say 'yes' if this is correct and 'no' if this it is not correct."

When the intelligent peripheral 40 includes speech recognition capability, the subscriber is further able to access the PCM and related services from a non-DTMF telephone, as well. Also, even when using a DTMF telephone, the subscriber may choose to verbally interact with the intelligent peripheral 40, avoiding having to tediously input touch tones from the telephone keypad and saving time and effort, which is especially advantageous when long series of numbers, such as account numbers or PINs, are involved. In an embodiment of the invention, Nuance Verifier 3.0 software may be incorporated in the intelligent peripheral 40 to further enable verification based on the caller's voice print, enabling efficient authentication, in addition to convenient speech interaction.

Figure 8:
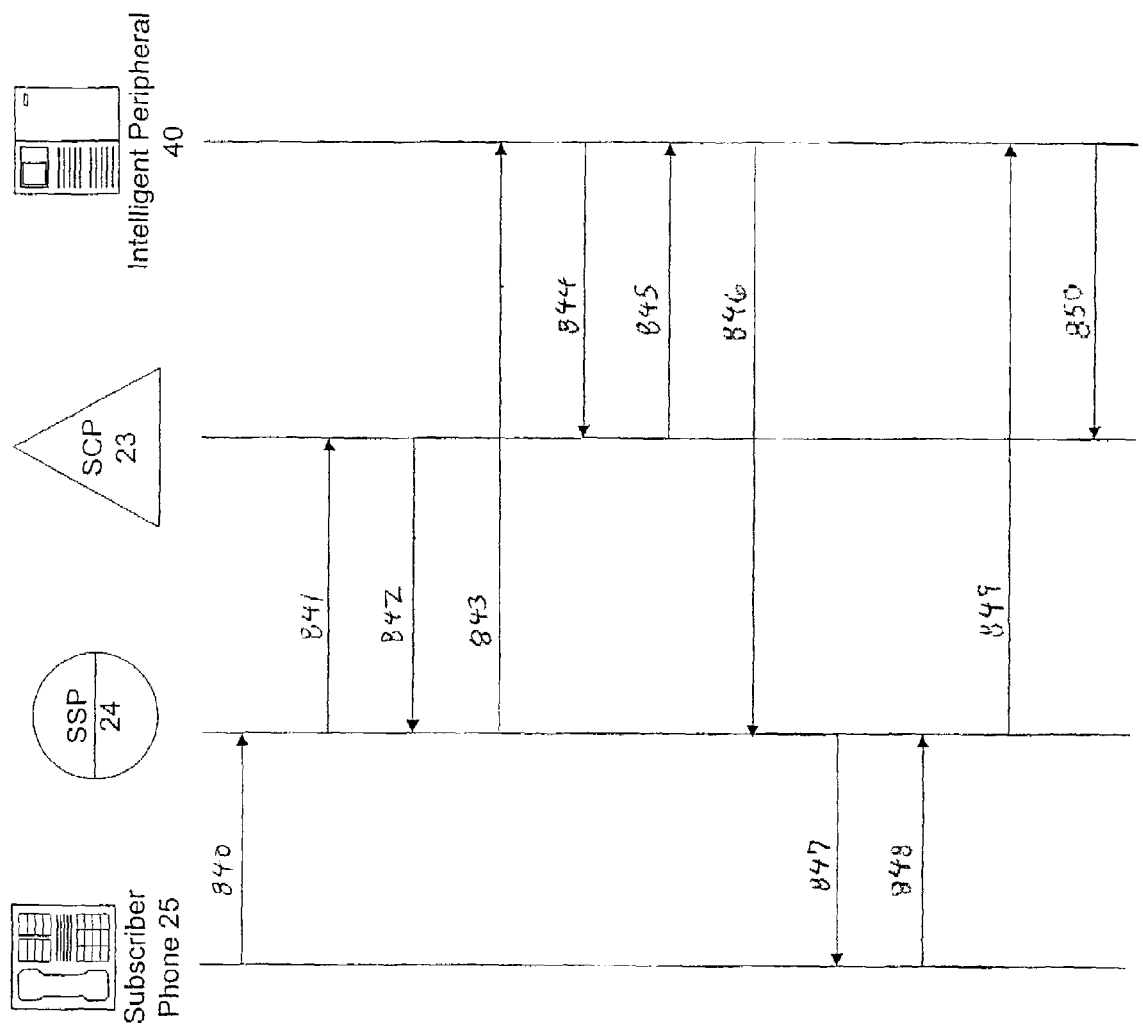
FIG. 8 is a call flow diagram illustrating subscriber requests for information from the PCM system using voice recognition, according to an aspect of the present invention.

When the subscriber wishes to review or edit call service data using speech recognition, the subscriber dials a toll-free number, e.g., an 800 number or local service provider number to access the IVR 45 of the intelligent peripheral 40, as described above. Referring to FIG. 8, the SSP 24 receives the dialed number from the subscriber telephone 25 at step 840 (assuming the subscriber calls from the subscriber telephone 25). The SSP 24 suspends the call and queries the SCP 23 at step 841 based, for example, on the calling party number and/or the dialed number. In response, the SCP 23 instructs the SSP 24 at step 842 to connect with the intelligent peripheral 40 temporarily to enable the speech recognition functionality of the intelligent peripheral 40. At step 843, the SSP 24 establishes the temporary connection to the intelligent peripheral 40 using GR-1129 protocol, without actually routing the call to the intelligent peripheral 40.

The substance of the voice interaction is dictated by the call service data in the subscriber's PCM account, as well as any related call services implemented independently or through the PCM service, as discussed below. When the call service data is stored in the SCP 23, the intelligent peripheral 40 retrieves the status and service information from the SCP 23 using SR-3511 at steps 844 and 845. In an alternative embodiment, the intelligent peripheral 40 may receive the call service data from the SCP 23 through a common object request broker architecture (CORBA) or a transmission control protocol/Internet protocol (TCP/IP) interface. The intelligent peripheral 40 may alternatively retrieve the call service data from an external database, such as the service status database 41 or other database. The SCP 23 is likewise able to retrieve data from the intelligent peripheral, or an external database related to the AIN service, through a generic data interface (GDI) server, for example, invoked by a GetData command.

Based on the status and call service data, the intelligent peripheral 40 plays announcements to the subscriber through the SSP 24 at steps 846 and 847. The subscriber's voice responses are received by the intelligent peripheral 40 through the SSP 24 at steps 848 and 849. The communications between the SSP 24 and the intelligent peripheral 40 incorporate GR-1129 protocol throughout the transaction. Changes made by the subscriber to the status and call service data through the speech recognition functionality are subsequently stored in the respective database, e.g., the SCP 23, at step 850 for implementation.

In an embodiment of the invention requiring authentication data, the intelligent peripheral 40 may initiate communication with the subscriber prior to retrieving status and service information from the SCP 23 at steps 844 and 845. Alternatively, when authentication data is stored at a database other than the SCP 23 (e.g., the ASI server 42), the intelligent peripheral 40 perform additional steps to retrieve the authentication data and query the subscriber through the SSP 24, accordingly.

Figure 9:
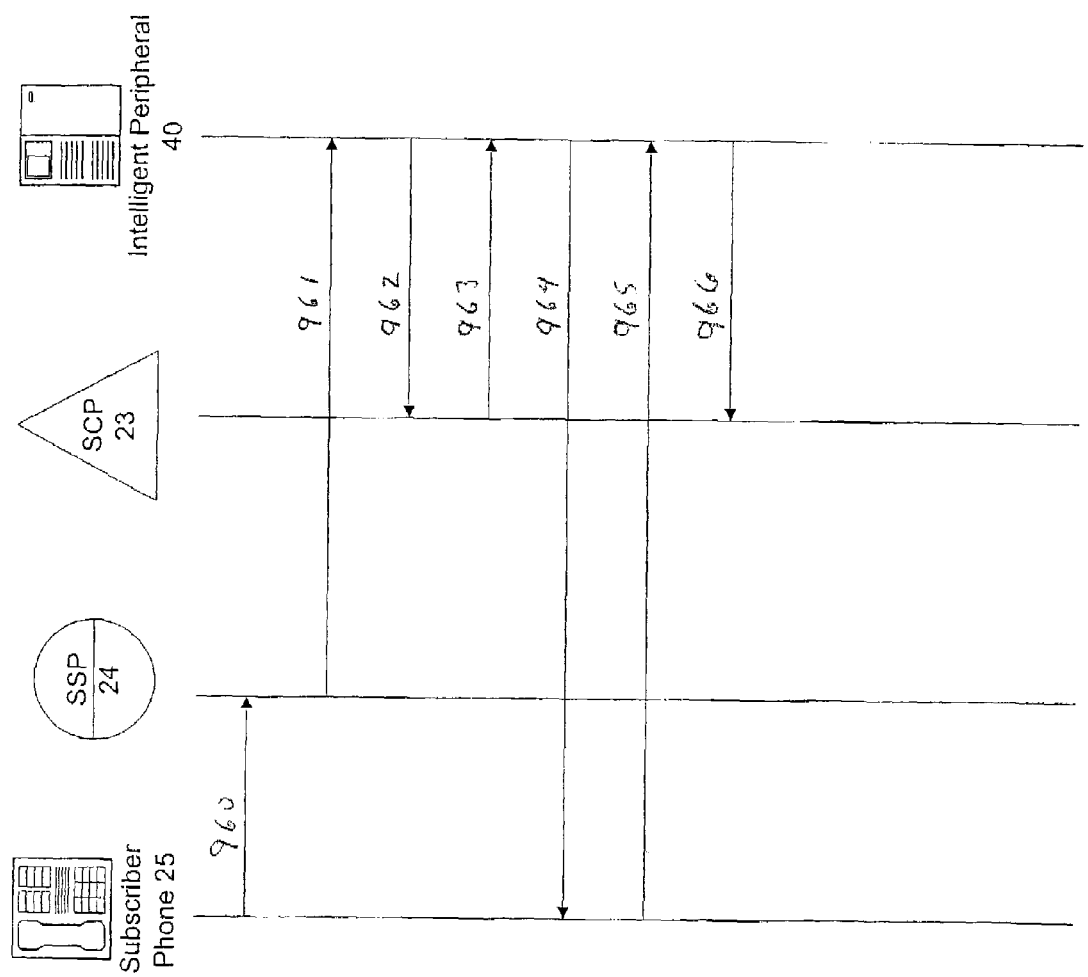
FIG. 9 is a call flow diagram illustrating subscriber requests for information from the PCM system using voice recognition, according to an alternative embodiment of the present invention.

FIG. 9 depicts another embodiment of the invention involving speech recognition. The subscriber dials the toll-free number or star code to access the IVR 45 of the intelligent peripheral 40, as described above. At step 960, the SSP 24 receives the dialed number from the subscriber telephone 25 (assuming the subscriber calls from the subscriber telephone 25). The SSP 24 routes the subscriber's call to the intelligent peripheral 40 at step 961, either through normal translations or based on instructions from the SCP 23 in response to a query from the SSP 24 (not pictured). The intelligent peripheral 40 then directly interacts with the subscriber, playing announcements and receiving voice responses. In particular, when the call service data is stored in the SCP 23, the intelligent peripheral 40 retrieves the status and service information from the SCP 23 using SR-3511, CORBA or TCP/IP at steps 962 and 963, in the same manner discussed above. Based on the status and call service data, the intelligent peripheral 40 plays announcements to the subscriber at step 964 and receives the subscriber's voice responses at step 965. Changes made by the subscriber to the status and call service data through the speech recognition functionality are subsequently stored in the respective database, e.g., the SCP 23, at step 966 for implementation.

Some call services implemented through the PCM service may include IVR interaction with an outside party caller, such as flexible call alert, discussed below. The IVR interaction with the caller may likewise include speech recognition. When speech recognition is involved, the outside caller may interact with the intelligent 5 peripheral 40 in the same manner indicated in FIG. 8 or FIG. 9. In particular, when the caller initiates a call from the outside party telephone 20, for example, to the subscriber telephone 25, the SSP 24 is the terminating switch. Consistent with FIG. 8, the SSP 24 queries the SCP 23 which identifies the particular calling service to be invoked. In response to the call, the SCP 23 instructs the SSP 24 to connect the caller to the intelligent peripheral 40 temporarily to enable the speech recognition. The intelligent peripheral 40 then communicates with the caller through the SSP 24 using GR-1129 protocol to enable announcements to be played and voice responses to be received from the caller. Alternatively, the SCP 23 may instruct the SSP 24 to route the call to the intelligent peripheral 40. Consistent with FIG. 9, the intelligent peripheral 40 then directly interacts with the caller, playing announcements and receiving voice responses. The intelligent peripheral 40 may subsequently route the call (if necessary) to the SSP 24 for connection using a two B-channel transfer, a release link transfer, a tied-up connection, or the like. Any caller data received through the speech recognition functionality that must be stored (e.g., data enabling customized reports, such as call detail records) is stored in the applicable database (e.g., the SCP 23), as discussed above.

Figure 10:
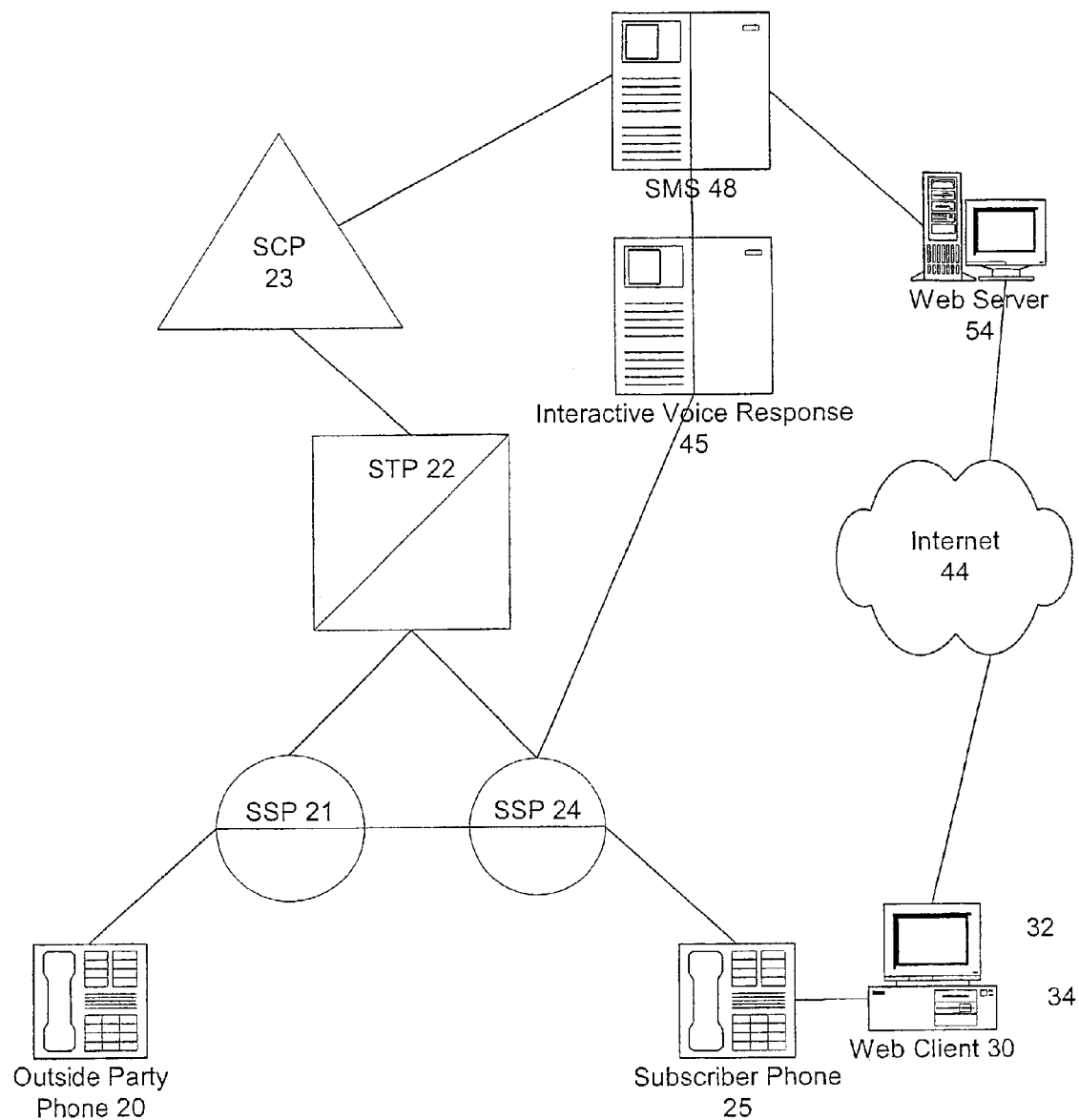
FIG. 10 is a block diagram showing an alternative exemplary PCM telecommunications network, according to an aspect of the present invention.

FIG. 10 depicts an alternative embodiment of the invention in which a service management system (SMS) 48 serves as the interface between the web server 54 and the SCP 23, as opposed to the intelligent peripheral 40. The SMS 48 is capable of transmitting and receiving information to and from the SCP 23. The SMS 48 also enables the subscriber to interface with the SCP 23 from both the subscriber phone 25 (or other DTMF telephone) through the IVR 45 and from the web client 30 (or other Internet compatible device) through the web server 54, via the Internet 44. Because an intelligent peripheral 40 is not necessary, an independent IVR 45 may be included in the network. For example, the IVR 45, available under the trademark CONVERSANT System for IVR, Version 6.0, Update 1, provided by Lucent Technologies, Inc., may be used. Although not pictured in FIG. 10, the network may further include an external database connected to the SMS 48, such as the service status database 41, and a separate authentication platform, such as the ASI server 42.

The PCM service implemented with the SMS 48 functions in a similar manner as described in FIGS. 2 and 3 with respect to the intelligent peripheral 40 and is discussed in detail below with respect to specific AIN based call control services. Generally, the SMS 48 receives data regarding the PCM service from the SCP 23 and sends the data to the web server 54, which causes the data to be displayed at the web client 30. In turn, changes to the PCM service are forwarded from the web client 30, through the web server 54, to the SMS 48, which stores the data and updates the SCP 23 to implement the modified PCM service.

Flexible Call Alert

The Flexible Call Alert service is AIN based and allows a subscriber connected to a communications network, including the Internet and other packet switched type data networks, as well as through conventional IVR and/or intelligent peripheral systems, to schedule call alerts and create messages for later playback to multiple recipients (group alert) at times designated by the subscriber. The flexible call alert service may be implemented as an independent service or part of a PCM portfolio of AIN services.

Figure 11:
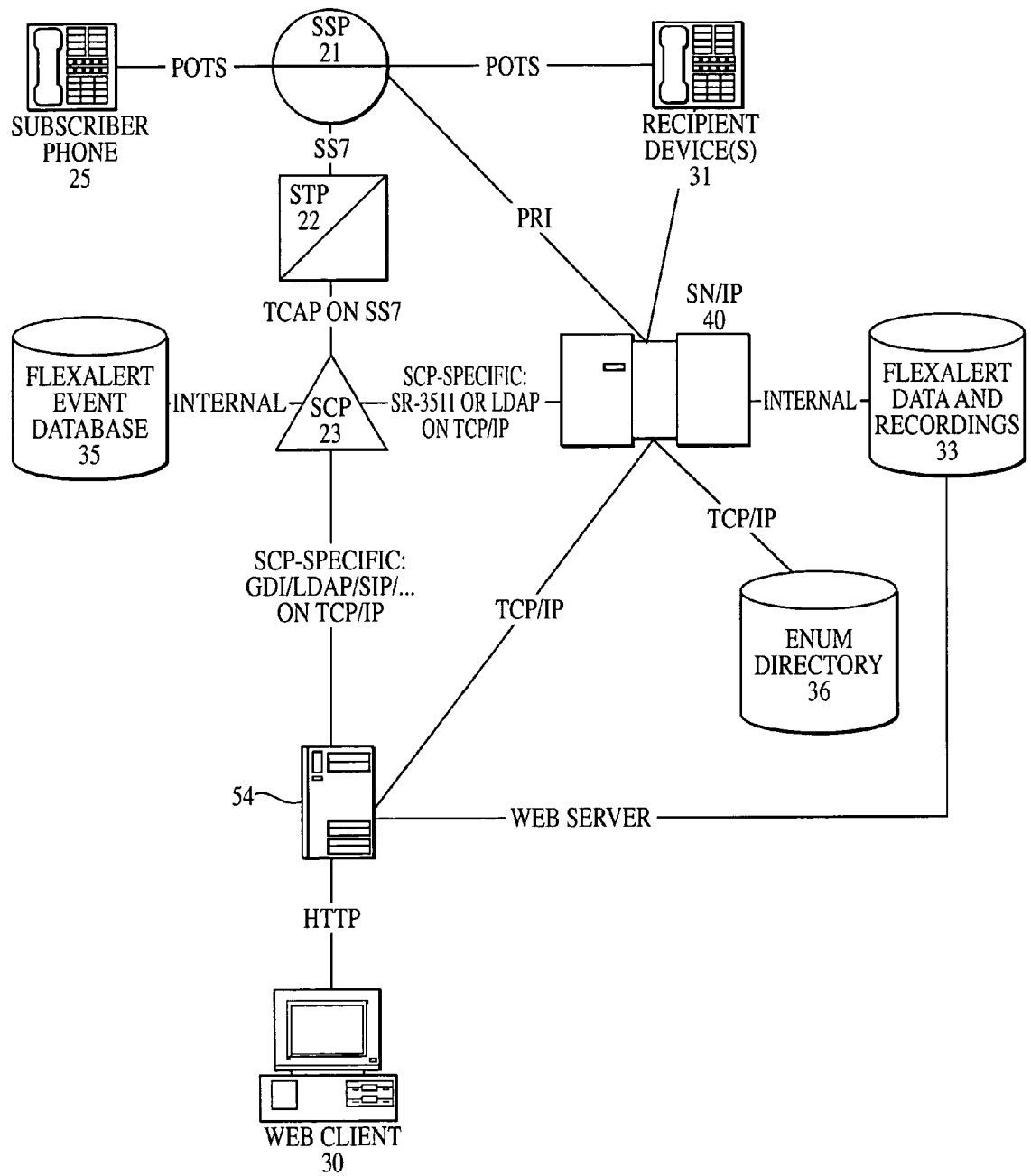
FIG. 11 is a block diagram showing an exemplary telecommunications network for a flexible call alert service, according to an alternative embodiment of the present invention.

FIG. 11 illustrates an exemplary telecommunications network in association with the flexible call alert service. A call alert subscriber uses the flexible call alert service to schedule, record, and receive alerts. The following are the primary elements of the flexible call alert system and their function within the system.

Referring to FIG. 11, a call alert recipient's communications device 31 such as a telephone, computer, pager, or other device is used to receive communications. The communications device 31 can be a telephone for which a call alert subscriber has scheduled an alert message for delivery; the delivery can be to more than one call alert recipient's telephone 31. The SSP 21 is the central office serving the call alert subscriber. The SCP 23 provides flexible call alert system record keeping functions for performance monitoring and billing.

Although the previous discussion describes obtaining data from the SCP 23, it also possible to receive the data from a stand alone database, such as a recordings database 33, an event database 35, and an ENUM directory 36. A flexible call alert event database 35 is associated with the SCP 23 and contains call alert subscriber-specific data about the subscriber's use of the flexible call alert service. While the event database may also be part of the SCP 23, it is also possible for the event database 35 to be a stand alone database as disclosed in the present embodiment. The flexible call alert event database 35 is also used for billing and performance monitoring.

A flexible call alert data and recordings database 33 stores a call alert subscriber's alert information including recordings, alert times, and alert numbers. While the recordings database 33 may also be part of the SCP 23, it is also possible for the recordings database 33 to be a stand alone database as disclosed in the present embodiment.

The SN/IP 40 runs the core logic of the flexible call alert system, providing a unique advantage of enabling web and IVR provisioning, message storage, time triggering, outbound call alerts, and message playing. The STP 22 relays Signaling System 7 (SS7) messages between the SSP 21 and the SCP 23. The web server 54 provides a web interface to the SN/IP 40 and may also interface with the flexible alert data and recordings database 33 so call alert subscribers can provision their alerts through the web rather than through an IVR. The web client 30 (e.g., Netscape Navigator or Microsoft Internet Explorer) can be used by a call alert subscriber to access flexible call alert web pages.

A database 36, such as a domain name server (DNS) directory or DNS with ENUM formatted records, contains a call alert recipient's contact numbers. The contact numbers may be in the format of a telephone number, Uniform Resource Identifier (URI), Uniform Resource Locator (URL), Uniform Resource Name (URN), E-mail address, Session Initialization Protocol URL (SIP URL), Telephonic URL (TEL URL), instant message address, SMS address, and other addressing schemes. The ENUM Directory 36 is primarily used by the SN/IP 40 to obtain the addresses/telephone numbers associated with a call alert recipient. For example, a phone number of a call alert recipient may be an input to the ENUM Directory 36 resulting in the ENUM Directory 36 outputting contact information in any one of the above formats.

The flexible alert system may also be implemented in a way where a subscriber or system administrator configures the system such that when one input in one of the above formats is provided to the ENUM Directory 36, the ENUM Directory 36 would output multiple contact addresses/numbers in any of the above formats. While the ENUM Directory 36 may be part of the SCP 23, it is also possible for the ENUM Directory 36 to be a stand alone database as disclosed in the present embodiment. The ENUM Directory 36 may be an ORACLE database provisioned in a way that is widely known in the art for such address/numbering mapping systems as a DNS system.

Together, the flexible call alert components can provide a service that includes numerous features in various embodiments of the invention. For example, the subscriber may turn the flexible call alert ON or OFF, and schedule an alert to occur at any time 365 days a year, 24 hours a day. With the flexible call alert service, a call alert subscriber can schedule an event and use the telephone system to provide a group alert to multiple call alert recipients at designated times and with a message lo determined by the subscriber. The flexible call alert service can remind a subscriber or other party about birthdays, anniversaries, meetings, laundry pick ups, oil changes, doctor appointments, deadlines, or other scheduled events.

Using a subscriber's phone 25, a subscriber may call into the flexible call alert service and access their personal calendars via the SSP 21 and the SN/IP 40 using an access scheme such as a PIN. Using a keypad on a subscriber's telephone 25, the call alert subscriber is prompted to key the date, time, and phone numbers of the recipient telephones 31 to which the subscriber wants a reminder message sent. Moreover, the flexible alert system is also accessible and programmable via a web client 30 and web server 54 over the Internet or other network. The flexible alert system may also be used to prompt for and record a subscriber's verbal message in the flexible alert data and recordings database 33 using the IVR capabilities of the SN/IP 40. The call alert system could then, using the SN/IP 40, call the pre-programmed telephone number at the specified date and time. Where no answer is provided, the flexible call alert system using the SN/IP 40 may ring the call alert recipient's phone number at intervals of time (e.g., every hour) until the call recipient's telephone 31 is answered and the message is played. Calls from the flexible call alert system to a call recipient's communications device 31 may occur over a standard POTS connection, a voice over Internet Protocol (VOIP) connection, TCP/IP connection, network connection, or other communications connection medium enabling a recipient to receive a message.

As an additional feature of the flexible call alert system, the SCP 23 can log events in the flexible call alert event database 35 based on information generated from the SSP 21 and SN/IP 40. Moreover, the ENUM directory 36 can be used to store multiple contact numbers associated with a particular recipient so that when a recipient has more than one number by which the recipient can be reached, the SN/IP 40 can interact with the ENUM directory 36 to look up all numbers associated with a call alert recipient. The SN/IP 40 can use these contact numbers/addresses sequentially or simultaneously to initiate calls to a call alert recipient until the call alert recipient receives the call alert. Once the call alert recipient receives the call alert, the SN/IP 40 stops calling all other numbers associated with the call alert recipient.

As stated above, an advantage of using a SN/IP 40 is that the subscriber interactively accesses the flexible call alert service setting up alerts by either of two methods—via a telecommunications device or Internet client. First, the subscriber may dial a toll-free number, e.g., an 800 number or local number, to access the IVR or other prompting system within the SN/IP 40. The subscriber may, additionally, access the flexible call alert system via the Internet using a network access system such as a web client 30.

Figure 12:
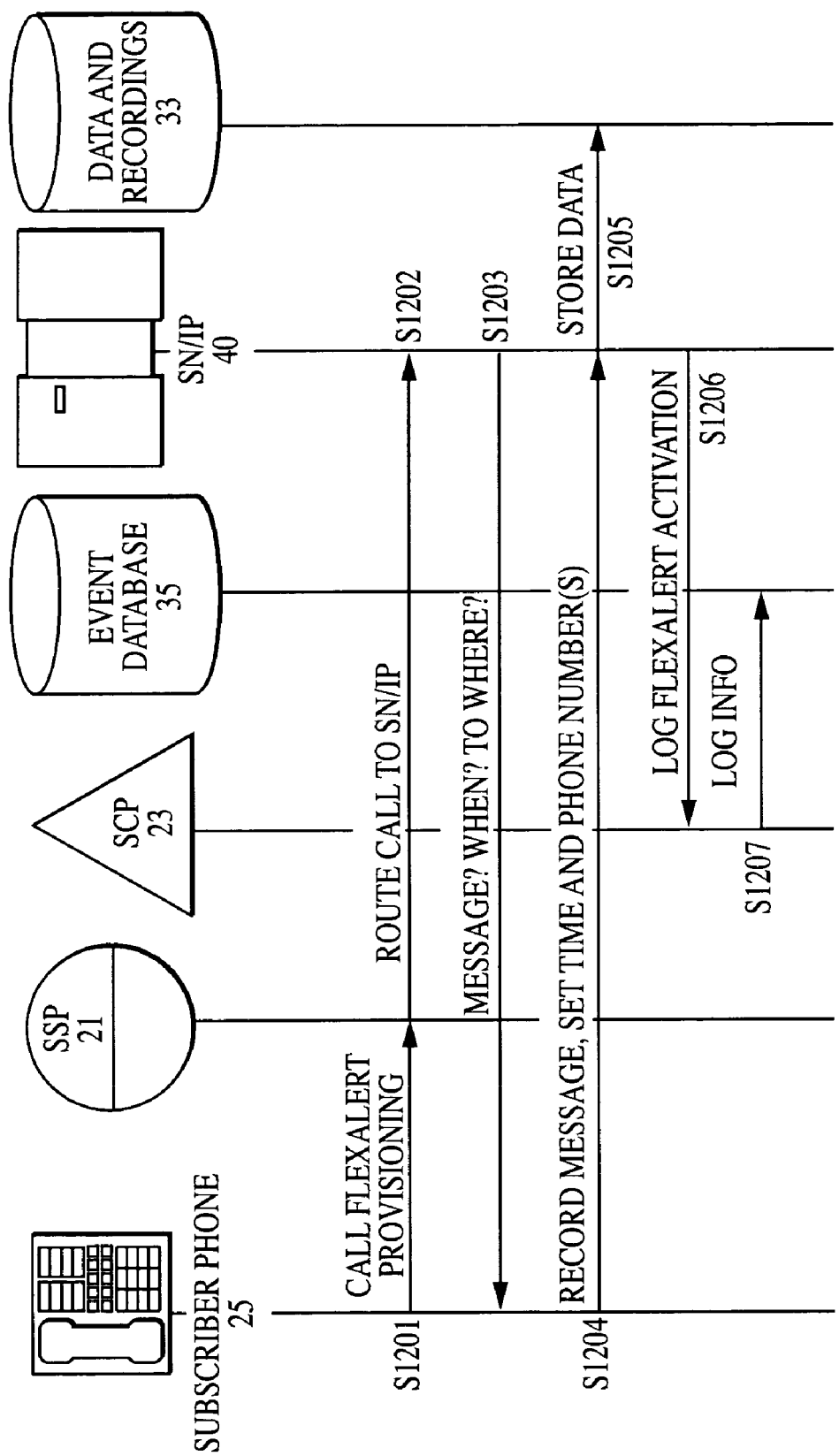
FIG. 12 is a call flow diagram illustrating a subscriber setting up a flexible call alert using voice recognition technology, according to an alternative embodiment of the present invention.

FIG. 12 is an exemplary call flow diagram illustrating a subscriber setting up a flexible call alert using voice recognition technology, according to an alternative embodiment of the present invention. In this call flow, a call alert subscriber's phone is used to dial the number for flexible call alert provisioning at step S1201. The SSP 21 then routes the call to the SN/IP 40 and the SN/IP 40 validates the call alert subscriber at step S1202. The SN/IP 40 then executes an IVR dialogue with the call alert subscriber to record the subscriber's alert message, date, and time to generate the alert, and phone number(s) to which the call alert subscriber's message is to be delivered. The call alert subscriber provides requested information by speaking (e.g., recording a message and providing other requested information) and/or pressing phone keypad buttons at steps S1203 and S1204. The SN/IP 40 then stores collected information in its flexible call alert data and recordings database 33 and sets an internal timer to go off at the call alert subscriber designated alert time at step S1205. Next, the SN/IP 40 notifies the SCP 23 of the call alert subscriber interaction at step S1206. The SCP 23, lastly, stores information about the interaction in its flexible call alert event database 35 at step S1207.

Figure 13:
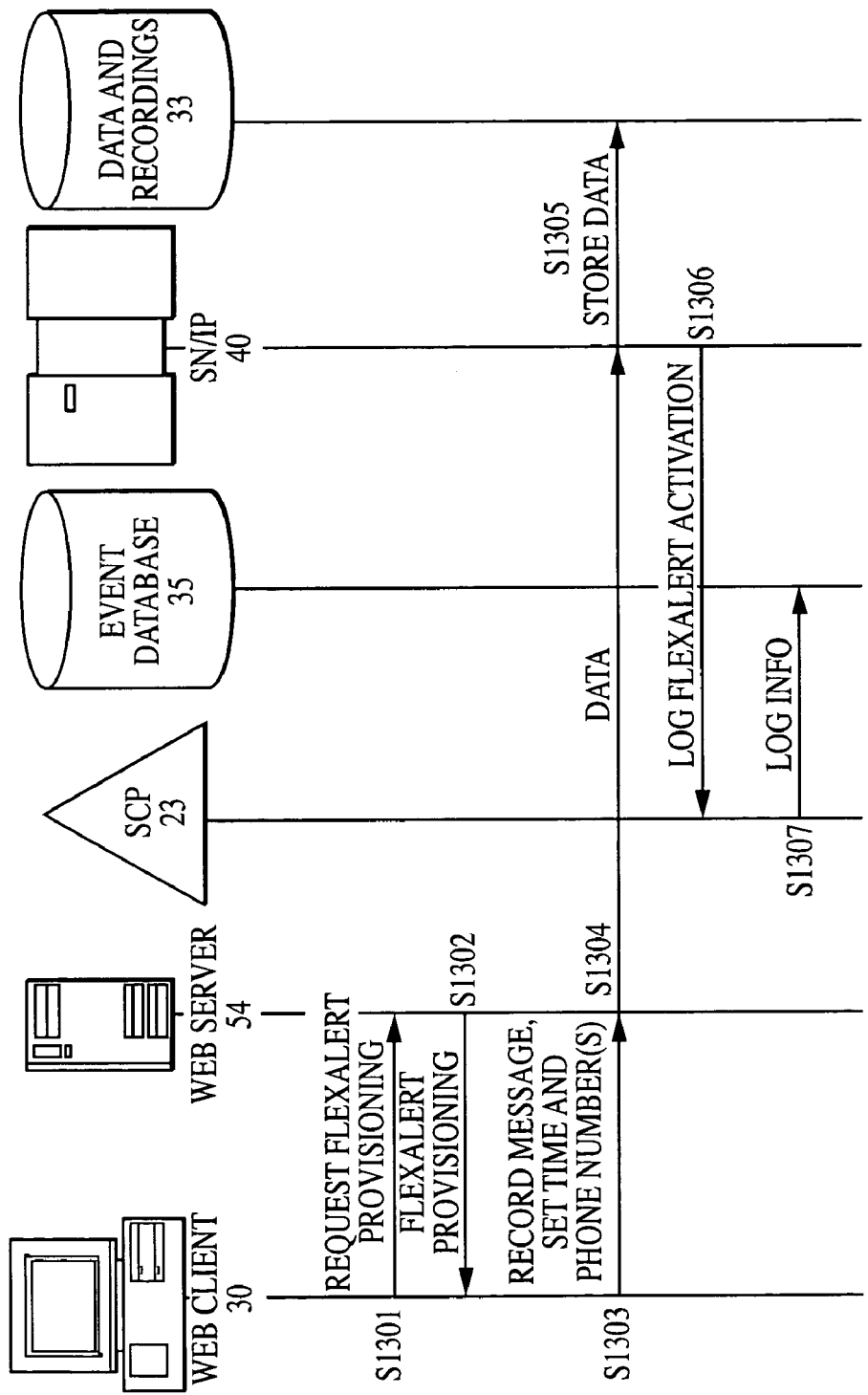
FIG. 13 is a call flow diagram illustrating a subscriber setting up a flexible call alert using the Internet, according to an alternative embodiment of the present invention.

FIG. 13 is a call flow diagram illustrating a subscriber setting up a flexible call alert using the Internet, according to an another embodiment of the present invention. In this call flow, a call alert subscriber uses a web client 30 to navigate to the flexible call alert provisioning web page where the web server 54 validates the call alert subscriber using the PCM validation framework at step S1301. The web server 54 subsequently displays the call alert provisioning web page at step S1302. The call alert subscriber then provides requested information using the web client 30. A message is then recorded using the PC hosting the web client 30 from which the message is sent to the web server 54 via a file transfer protocol (FTP) or other transfer protocol at step S1303. The web server 54 subsequently forwards the information to the SN/IP 40 at step SI 304. Next, the SN/IP 40 stores the collected information in the flexible alert data and recordings database 33 and sets an internal timer to go off at an alert time designated by the call alert subscriber at step S1305. The SN/IP 40 then notifies the SCP 23 of the customer interaction at step S1306. Finally, the SCP 23 stores the information about the interaction in its flexible alert event database 35 at step S1307.

Figure 14:
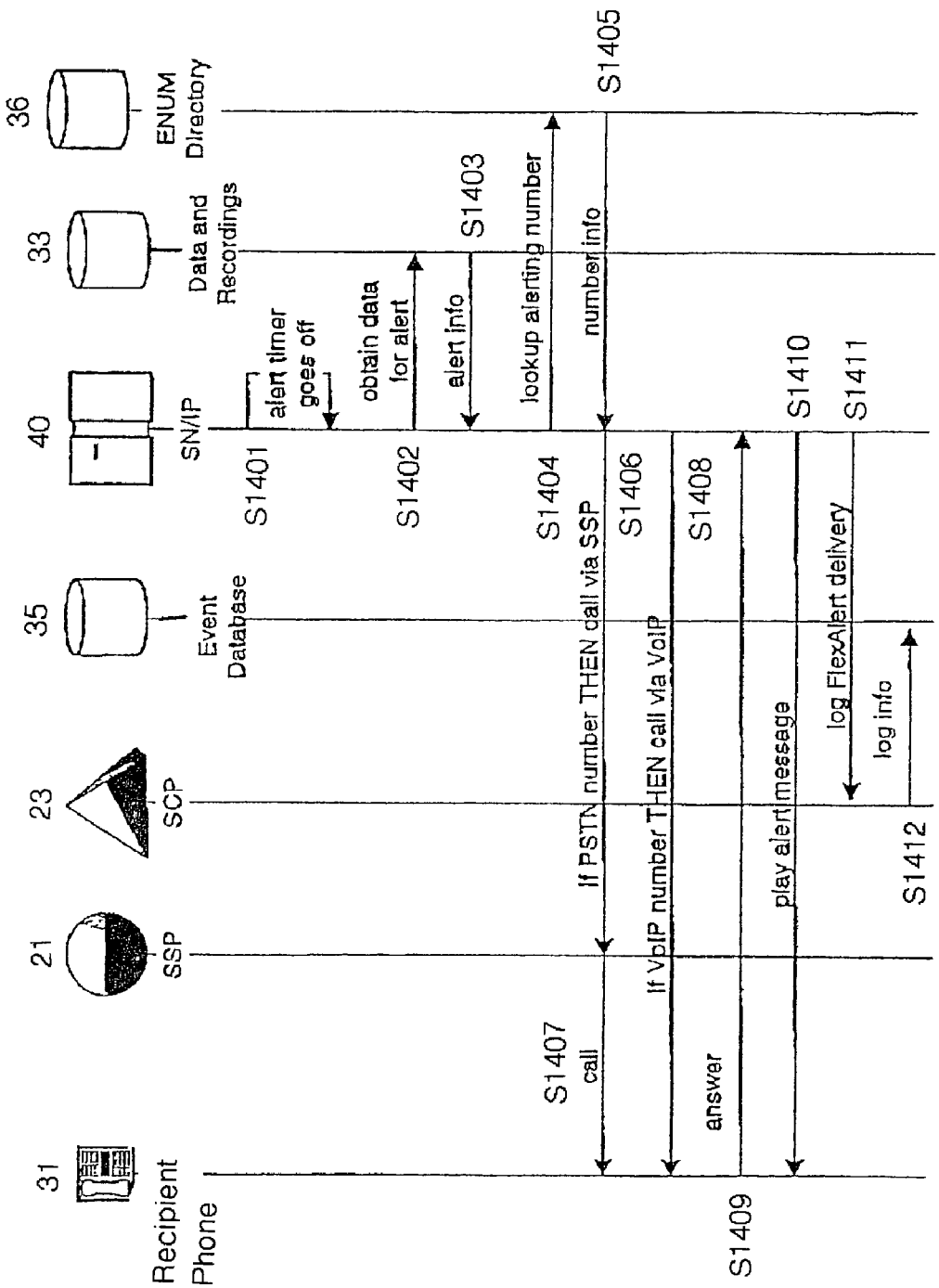
FIG. 14 is a call flow diagram illustrating the generation of an alert, according to an alternative embodiment of the present invention.

FIG. 14 is an exemplary call flow diagram illustrating the generation of an alert, according to an embodiment of the present invention. In this call flow, the SN/IP 40 determines that a time specified by a call alert subscriber (e.g., a previously provisioned alert timer) is reached in the SN/IP 40 at step S1401. The SN/IP 40 then requests the information (e.g., subscriber information, recipient information, and the recorded message) about the alert associated with the alert timer from the flexible alert data and recordings database 33 at step S1402. The flexible alert data and recordings database 33 then sends the alert information to the SN/IP 40 at step S1403.

Subsequently, the SN/IP 40 looks up the numbers to send an alert to in the ENUM directory 36 at step S1404. The ENUM directory 36 then sends the alert number information to the SN/IP 40 at step S1405. Next, if an alerting number is a PSTN number (as indicated by its ENUM entry), the SN/IP 40 generates the call through the PSTN via the SSP 21 to the call alert recipient's terminating device 31 at steps S1406 and S1407. If the alerting number is an IP address, i.e., reachable via VoIP, the call is generated using VoIP by the SN/IP 40 to the call alert recipient's terminating device at step S1408. If a call is not answered in steps S1406–S1408, steps S1406–S1408 may be repeated for a default time, default time interval, subscriber set time, or subscriber set time interval until the call alert recipient answers. If the call is still not answered for a subscriber set time, previously set time, or by a set number of repeat attempts, the alert attempt is terminated.

The SN/IP 40 may attempt to connect to an alert recipient via several addresses/numbers either simultaneously or sequentially. When a call alert recipient answers the SN/IP generated call, step S1409, the SN/IP 40 terminates all other connection attempts to addresses/numbers associated with the call alert recipient for a particular alert and plays the recorded message for the alert at step S1410. The SN/IP 40 then notifies the SCP 23 of alert delivery at step S1411. Lastly, the SCP 23 stores the information about the delivery in its flexible call alert event database 35 at step S1412.

In one embodiment, a customer of a telecommunications network calls the carrier to activate a call alert feature that automatically calls the customer back at his home telephone number. In this embodiment, the customer either dials a telephone number associated with the call alert service, such as an 800 telephone number or alternatively uses a verticle services code, e.g., *59. Of course, web access is also possible.

In any event, once the customer has contacted the appropriate network element, e.g., the SN/IP 40 or web server 54, the customer is queried. For example, the SN/IP 40 may ask the customer the time and date of when the call to the customer should be placed, or a web screen may provide fields where the customer can enter the call back time. After the information has been entered, a call is placed to the customer's home telephone number at the specified time. The call may be heard as the usual ring at the customer's premises or a special ring may be used. Once the customer answers the call, the carrier can play a prerecorded announcement to the customer, for example, thanking the customer for using the service.

During the set up of the call back service (or when answering the call alert), the customer may be asked whether the call alert is a one time event or whether the customer should be called periodically, e.g., at the same time each day or the same time each week. If the periodic option is requested, the customer will regularly receive a call at the specified interval. Alternatively, the default setting could be that the call alert is periodically sent at some predetermined interval.

The service can automatically be deactivated after a one time event occurs. If a periodic call back has been requested, the customer can deactivate the service by dialing a special vertical service code, e.g., *58. Alternatively, the customer can specify a deactivation time when configuring the service or can deactivate the service when answering the call alert by responding to an IVR query.

Billing for such a service could be monthly. Alternatively, the carrier could bill the customer each time the service is used, i.e., on a per call alert basis.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards discussed in this application (e.g., GR-1129, HTML, HTTP, LDAP, SR-3511, TCP/IP, VoIP, UDP/IP, URL, URI, URN, and XML) represent examples of the state of the art. Such standards are periodically superseded by faster or more efficient equivalents having essentially the same functions. Accordingly, replacement standards and protocols having the same functions are considered equivalents.

What is claimed is:

1. A method for implementing a flexible call alert service comprising:

receiving, from a message sending subscriber, a message, information of a plurality of recipients of the message who are each different from the message sending subscriber, and a time when the message is to be delivered to the plurality of recipients over a telephone system, the message, information and time each being received via a web client and via a service node having voice recognition functionality, both the web client and the service node interfacing with a personal call manager that allows a subscriber to customize and execute a plurality of telecommunications services including the flexible call alert service;

determining that the time input by the message sending subscriber has been reached;

initiating delivery of the message to the plurality of recipients, using a plurality of addresses for at least one of the recipients, when the time has been determined to have been reached, delivery of the message to the recipients including a special ring indicating the flexible call alert message is being received; and stopping the delivery of the message to the recipients having the plurality of addresses after the at least one recipient has received the message repeating the initiating at a default repeat time, default repeat time interval, subscriber set repeat time, or subscriber set repeat time interval when the subscriber does not receive the message; and terminating the repeating at a subscriber set terminating time, previously set terminating time, or a set number of repeats when the subscriber has received the message.

2. The method of claim 1 further comprising:

repeating the initiating at a default repeat time, default repeat time interval, subscriber set repeat time, or subscriber set repeat time interval when the subscriber does not receive the message; and terminating the repeating at a subscriber set terminating time, previously set terminating time, or a set number of repeats.

3. The method of claim 1 further comprising:

obtaining a dual tone multi-frequency input or voice input over a telephone for the receiving.

4. The method of claim 1 further comprising:

retrieving the plurality of addresses for the recipient from an ENUM enabled directory.

5. The method of claim 1 in which the initiating further comprises sequencing the plurality of addresses for the recipient.

6. The method of claim 1 in which the initiating further comprises broadcasting simultaneously to the plurality of addresses for the recipient.

7. The method of claim 1 further comprising:

logging event information of the initiating; and storing the event information for use in billing and presentment.

8. The method of claim 1 further comprising:

billing the subscriber for using flexible call alert in response to the message, information, and time being received from the subscriber.

9. A computer readable medium with instructions to implement a flexible call alert service comprising:

receiving, from a message sending subscriber, a message, information of a plurality of recipients of the message who are each different from the message sending subscriber, and a time when the message is to be delivered to the plurality of recipients over a telephone system, the message, information and time each being received via a web client and via a service node having voice recognition functionality, both the web client and the service node interfacing with a personal call manager that allows a subscriber to customize and execute a plurality of telecommunications services including the flexible call alert service;

determining that the time input by the message sending subscriber has been reached;

initiating delivery of the message to the plurality of recipients, using a plurality of addresses for at least one of the recipients, when the time has been determined to have been reached, delivery of the message to the recipients including a special ring indicating the flexible call alert message is being received; and stopping the delivery of the message to the recipients having the plurality of addresses after the at least one recipient has received the message has received the message repeating the initiating at a default repeat time, default repeat time interval, subscriber set repeat time, or subscriber set repeat time interval when the subscriber does not receive the message; and terminating the repeating at a subscriber set terminating time, previously set terminating time, or a set number of repeats when the subscriber has received the message.

10. The computer readable medium of claim 9 further comprising:

retrieving the plurality of addresses for the recipient from an ENUM enabled directory.

11. A flexible call alert system for implementing a flexible call alert service comprising:

a recording database; and an intelligent peripheral that receives suscribers information and a message from a web client, the subscribers information including a time when a message sender wants the message to be sent wherein each of the subscribers is different from the sender, sends the subscriber information and the message to the recording database, retrieves at least part of the subscribers information and the message from the recording database when the time has been reached, sequentially sends the message using a plurality of addresses of the subscribers information, the sending the message comprising delivering the message to a telephone of the subscribers and causing a special ring indicating the flexible call alert message is being received, and stops sending using the plurality of addresses when at least one of the subscribers receives the message, the intelligent peripheral interfacing with a personal call manager that allows a subscriber to customize and execute a plurality of telecommunications services including the flexible call alert service repeating the sending at a default repeat time, default repeat time interval, subscriber set repeat time, or subscriber set repeat time interval when the subscriber does not receive the message; and terminating the repeating at a subscriber set terminating time, previously set terminating time, or a set number of repeats when the subscriber has received the message.

12. The system of claim 11 further comprising:

a directory that sends the plurality of addresses for the recipient to the intelligent peripheral.

13. The system of claim 11 further comprising:

an SCP that receives from the intelligent peripheral transaction information and stores the transaction information.

* * * * *